United States Patent
Kim

(10) Patent No.: US 10,516,766 B2
(45) Date of Patent: Dec. 24, 2019

(54) MOBILE COMMUNICATION BASE STATION SYSTEM

(71) Applicant: SOLiD, INC., Seongnam-si, Gyeonggi-do (KR)

(72) Inventor: Hyunchae Kim, Seoul (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 15/511,462

(22) PCT Filed: Sep. 17, 2014

(86) PCT No.: PCT/KR2014/008670
§ 371 (c)(1),
(2) Date: Mar. 15, 2017

(87) PCT Pub. No.: WO2016/043360
PCT Pub. Date: Mar. 24, 2016

(65) Prior Publication Data
US 2017/0257465 A1    Sep. 7, 2017

(30) Foreign Application Priority Data

Sep. 15, 2014 (KR) .......................... 10-2014-0122162

(51) Int. Cl.
*H04W 72/04* (2009.01)
*H04L 29/06* (2006.01)

(52) U.S. Cl.
CPC .............. *H04L 69/08* (2013.01); *H04L 29/06* (2013.01); *H04W 72/042* (2013.01)

(58) Field of Classification Search
CPC ....... H04W 72/042; H04L 69/08; H04L 12/28
See application file for complete search history.

(56) References Cited

U.S. PATENT DOCUMENTS

| 6,643,524 | B1 | 11/2003 | Ishii et al. | |
| 2005/0286521 | A1* | 12/2005 | Chiang | H04J 3/1652 370/389 |
| 2008/0039055 | A1* | 2/2008 | Hannikainen | H04L 69/32 455/414.1 |
| 2010/0208777 | A1* | 8/2010 | Ogaz | H04L 12/2838 375/219 |
| 2011/0182255 | A1 | 7/2011 | Kim et al. | |
| 2013/0170435 | A1* | 7/2013 | Dinan | H04L 45/50 370/328 |

FOREIGN PATENT DOCUMENTS

| JP | 10-2011-0087949 A | 8/2011 |
| KR | 10-2000-0028939 A | 5/2000 |
| KR | 10-2013-0067153 A | 6/2013 |

OTHER PUBLICATIONS

International Search Report for PCT/KR2014/008670 dated May 11, 2015 [PCT/ISA/210].

\* cited by examiner

*Primary Examiner* — Wei Zhao
(74) *Attorney, Agent, or Firm* — Sughrue Mion, PLLC

(57) ABSTRACT

A base station system includes a main conversion unit configured to receive a first downlink frame conforming to a first protocol and a second downlink frame conforming to a second protocol, and configured to reconstruct the first and second downlink frames to conform to a third protocol and generate a downlink transmit frame; and a radio unit including a remote conversion unit that receives the downlink transmission frame and disassembles the received downlink transmission frame to output at least one of the first and second downlink frames.

19 Claims, 4 Drawing Sheets

MOBILE COMMUNICATION BASE STATION SYSTEM

CROSS-REFERENCE TO RELATED APPLICATIONS

This application is a National Stage of International Application No. PCT/KR2014/008670, filed Sep. 17, 2014, and claims priority from Korean Patent Application No. 10-2014-0122162 filed Sep. 15, 2014, the contents of which are incorporated herein by reference in their entireties.

BACKGROUND

1. Field

One or more example embodiments relate to a mobile communication base station system, and more particularly, to a mobile communication base station system having a structure in which a digital unit and a radio unit are separated from each other.

2. Description of the Related Art

Recently, a separate structure, in which a digital unit which is a data processing part of a base station and a radio unit which is a wireless transmitting and receiving part of the base station are separated from each other to be placed in different areas and are connected to each other through an optical cable, is widely applied to a mobile communication base station system in response to a trend of decreasing a cell size in service coverage due to a rapid increase in mobile traffic along with traffic caused by an Internet service.

A standard protocol for communication between the digital unit and the radio unit in the mobile communication base station system with the separate structure includes a common public radio interface (CPRI) protocol, an open radio equipment interface (ORI) protocol, and an open base station architecture initiative (OBSAI) protocol. However, since the protocols only define standards for user data between the digital unit and the radio unit, standards defined individually for each manufacturer are used for control information, synchronization information, or the like. As a result, compatibility between digital units and radio units manufactured by different manufacturers is not guaranteed, and compatibility between organization and management (O&M) servers for controlling the digital units and radio units is also not guaranteed.

FIG. 1 is a view of a general mobile communication base station system adopting the above-described separate structure. As illustrated in FIG. 1, in the general mobile communication base station system, a digital unit is connected to a radio unit manufactured by an identical manufacturer to form a digital unit-radio unit network due to compatibility issues. For example, a digital unit A1 manufactured by a manufacturer A is connected to a radio unit A2 manufactured by the same manufacturer A without being connected to a radio unit B2 manufactured by a manufacturer B or a radio unit C2 manufactured by a manufacturer C. Similarly, a digital unit B1 manufactured by the manufacturer B is connected to the radio unit B2, and a digital unit C1 manufactured by the manufacturer C is connected to the radio unit C2.

Due to such equipment compatibility problems, a mobile communication provider cannot use low-cost equipment with high performance provided by manufacturers that independently supply only digital units or radio units when constructing a mobile communication base station system. Therefore, it is difficult for the mobile communication service provider to reduce cost of constructing the mobile communication base station system.

Furthermore, in the general mobile communication base station system as illustrated in FIG. 1, a digital unit-radio unit network including equipment manufactured by a particular manufacturer is controlled by an O&M server provided by the manufacturer. For example, the digital unit A1 and the radio unit A2 manufactured by the manufacturer A are controlled through an O&M server A3 provided by the manufacturer A. Similarly, the digital unit B1 and the radio unit B2 manufactured by the manufacturer B are controlled through an O&M server B3 provided by the manufacturer B, and the digital unit C1 and the radio unit C2 manufactured by the manufacturer C are controlled through an O&M server C3 provided by the manufacturer C.

Due to such equipment compatibility problems, a mobile communication service provider needs to control each digital unit-radio unit network including equipment manufactured by a particular manufacturer using an O&M server provided by the same manufacturer, and thus it is difficult for the mobile communication service provider to efficiently manage the entire system.

SUMMARY

One or more example embodiments include a mobile communication base station system capable of reducing cost of constructing a mobile communication system and efficiently managing and operating the entire system.

According to an aspect of the inventive concept, there is provided a base station system includes a main conversion unit configured to receive a first downlink frame conforming to a first protocol and a second downlink frame conforming to a second protocol, and configured to reconstruct the first and second downlink frames to conform to a third protocol and generate a downlink transmit frame; and a radio unit including a remote conversion unit that receives the downlink transmission frame and disassembles the received downlink transmission frame to output at least one of the first and second downlink frames.

According to an exemplary embodiment, the first and second protocols may be different closed protocols, and the third protocol may be an open protocol.

According to an exemplary embodiment, the first downlink frame may include first control information and first data, the second downlink frame may include second control information and second data, and the main conversion unit may be configured to remove control information from any one of the first and second downlink frames and generate the downlink transmission frame.

According to an exemplary embodiment, the main conversion unit may include a first protocol adaptive transceiver configured to receive the first downlink frame; a second protocol adaptive transceiver configured to receive the second downlink frame; a first processor configured to receive the first downlink frame from the first protocol adaptive transceiver, and configured to remove and output the first control information from the first downlink frame or output the first downlink frame intactly; a second processor configured to receive the second downlink frame from the second protocol adaptive transceiver, and configured to remove and output the second control information from the second downlink frame or output the second downlink frame intactly; and a main transceiver connected to the first and second processors and configured to reconstruct any one of the first and second control information and the first and second data to conform to the third protocol and generate the downlink transmission frame.

According to an exemplary embodiment, the remote conversion unit may include a remote transceiver configured to receive the downlink transmission frame; and a remote processor configured to disassemble the received downlink transmission frame to output at least one of the first and second downlink frames.

According to an exemplary embodiment, the radio unit may further include at least one remote radio head configured to receive a downlink frame including control information of the first and second downlink frames from the remote conversion unit.

According to an exemplary embodiment, the remote radio head may be configured to convert data of the received downlink frame into an analog radio frequency signal according to the control information included in the received downlink frame and output the converted analog radio frequency signal.

According to an exemplary embodiment, the radio unit may further include at least one transceiver configured to receive a downlink frame, from which control information has been removed, of the first and second downlink frames from the remote conversion unit.

According to an exemplary embodiment, the transceiver may be configured to convert data of the received downlink frame into an analog radio frequency signal and output the converted analog radio frequency signal.

According to an exemplary embodiment, the remote conversion unit may be configured to output the received downlink transmit frame intactly, and the radio unit may further include at least one PHY interface configured to receive the downlink transmission frame from the remote conversion unit and configured to transmit the received downlink transmission frame to another radio unit.

According to an exemplary embodiment, the base station system may further include a main management server configured to generate radio unit control information for controlling the radio unit, wherein the main conversion unit may further receive radio unit control information for controlling the radio unit from the main management server, and reconstruct the radio unit control information and the first and second downlink frames to conform to the third protocol and generates the downlink transmission frame, and the remote conversion unit may disassemble the downlink transmission frame to further output the radio unit control information.

According to an exemplary embodiment, the radio unit may further include a controller configured to receive the radio unit control information from the remote conversion unit and control the radio unit in response to the radio unit control information.

According to another aspect of the inventive concept, there is provided a base station system includes a radio unit having a remote conversion unit configured to digitize analog radio frequency signals received from a plurality of terminals and generate an uplink transmission frame; and a main conversion unit configured to receive the uplink transmission frame, and configured to disassemble the received uplink transmission frame to generate a first uplink frame conforming to a first protocol and a second uplink frame conforming to a second protocol, wherein the uplink transmit frame is configured to conform a third protocol.

According to an exemplary embodiment, the first and second protocols may be different closed protocols, and the third protocol may be an open protocol.

According to an exemplary embodiment, the radio unit may further include at least one remote radio head configured to digitize and output data included in some of the analog radio frequency signals together with corresponding control information; and at least one transceiver configured to digitize and output data included in some other of the analog radio frequency signals.

According to an exemplary embodiment, the remote conversion unit may further include a remote processor configured to generate the uplink transmission frame by combining the digitized data and control information transmitted from the remote radio head and the digitized data transmitted from the transceiver; and a remote transceiver configured to transmit the uplink transmission frame to the main conversion unit.

According to an exemplary embodiment, the radio unit may further include a controller configured to output state information of the radio unit to the remote processor, wherein the remote processor may be configured to generate the uplink transmission frame by combining the digitized data and control information transmitted from the remote radio head, the digitized data transmitted from the transceiver, and the state information transmitted from the controller.

According to an exemplary embodiment, the radio unit may further include at least one PHY interface configured to receive an uplink transmission frame from another radio unit, wherein the remote conversion unit may be configured to transmit the uplink transmission frame received from the other radio unit to the main conversion unit intactly.

According to an exemplary embodiment, the main conversion unit may include a main transceiver configured to receive the uplink transmission frame and disassemble the received uplink transmission frame; first and second processors configured to output control information and data corresponding to each other intactly, and configured to add corresponding control information to data having no control information and output the data, respectively; a first protocol adaptive transceiver connected to the first processor and configured to generate the first uplink frame conforming to the first protocol using control information and data output from the first processor; and a second protocol adaptive transceiver connected to the second processor and configured to generate the second uplink frame conforming to the second protocol using control information and data output from the second processor.

According to an exemplary embodiment, the base station system may further include a main management server configured to generate first processor control information for controlling whether to add control information in the first processor, second processor control information for controlling whether to add control information in the second processor, and the first and second protocol information, wherein each of the first and second processors may be configured to output control information and data corresponding to each other intactly in response to corresponding processor control information of the first and second processor control information, or configured to add corresponding control information to data having no control information and output the data, and the first protocol adaptive transceiver may be configured to generate the first uplink frame based on the first protocol information, and the second protocol adaptive transceiver may be configured to generate the second uplink frame based on the second protocol information.

According to an exemplary embodiment, the uplink transmission frame may include state information of the radio unit, and the main transceiver may be configured to disassemble the received uplink transmission frame and transmit the state information to the main management server.

According to a mobile communication base station system of the inventive concept, compatibility issues between devices may be solved by converting frames output from digital units and conforming to a closed protocol to conform to an open protocol via a main conversion unit and a remote conversion unit and by transmitting the converted frames to radio units. Accordingly, the system may be constructed using low-cost equipment with high performance provided by various manufacturers by a mobile communication service provider, thereby reducing cost of constructing the system.

Furthermore, according to the mobile communication base station system of the inventive concept, since equipment supplied by various manufacturers can be managed via one main management server, a mobile communication provider may efficiently manage and operate the entire system.

BRIEF DESCRIPTION OF THE FIGURES

These and/or other aspects will become apparent and more readily appreciated from the following description of the example embodiments, taken in conjunction with the accompanying drawings in which.

DETAILED DESCRIPTION OF EXEMPLARY EMBODIMENTS

Figure 1:
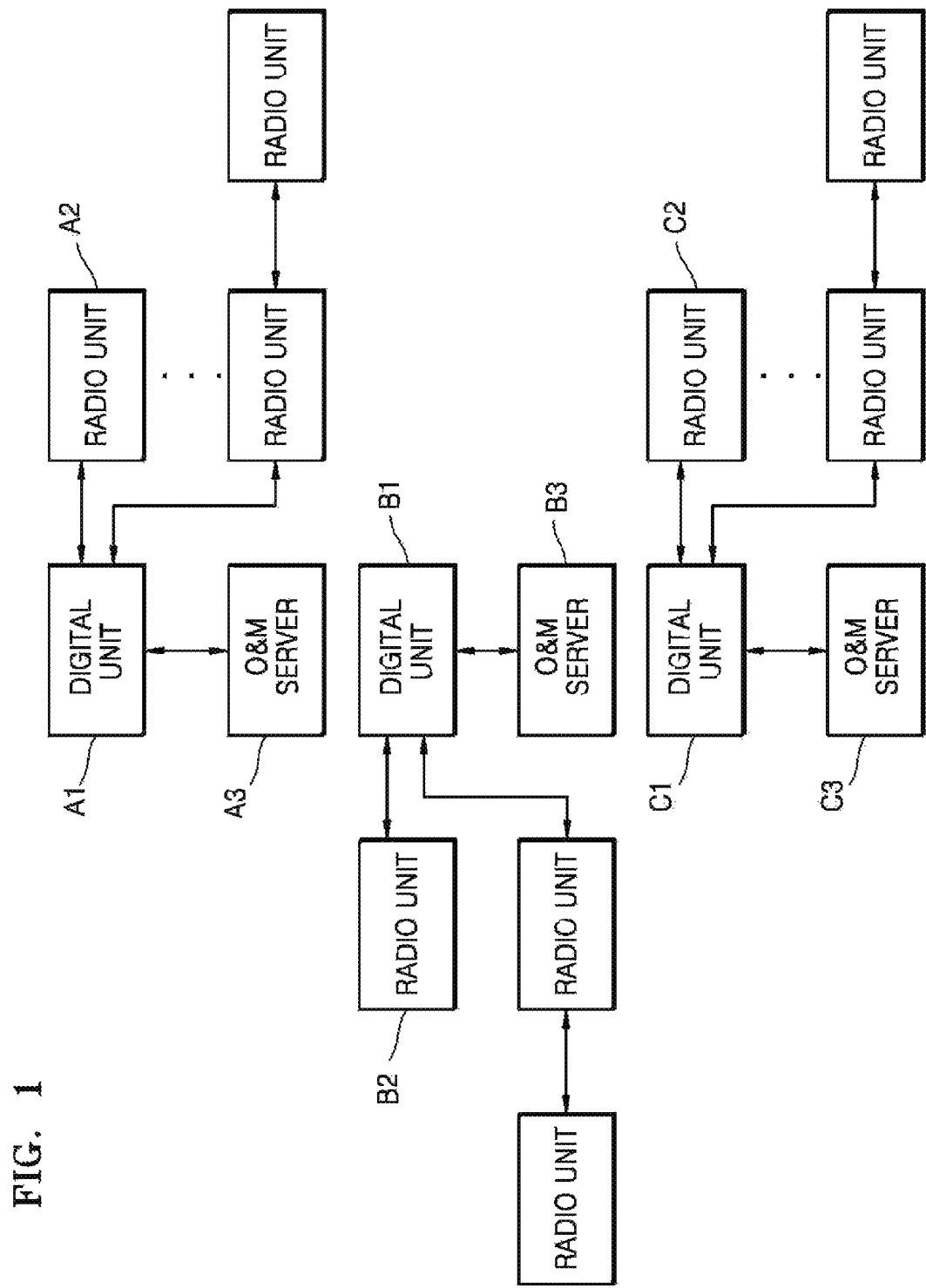
FIG. 1 is a view of a general mobile communication base station system.

Since the inventive concept may have diverse modified embodiments, preferred example embodiments are illustrated in the drawings and are described in the detailed description. However, this does not limit the inventive concept within specific embodiments and it should be understood that the inventive concept covers all the modifications, equivalents, and replacements within the idea and technical scope of the inventive concept.

In the description of the present disclosure, certain detailed explanations of the related art are omitted when it is deemed that they may unnecessarily obscure the essence of the inventive concept. In addition, numeral figures (for example, 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms such as ". . . unit", ". . . module", or the like refer to units that perform at least one function or operation, and the units may be implemented as hardware or software or as a combination of hardware and software.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

Hereinafter, example embodiments of the inventive concept will be described in detail.

Figure 2:
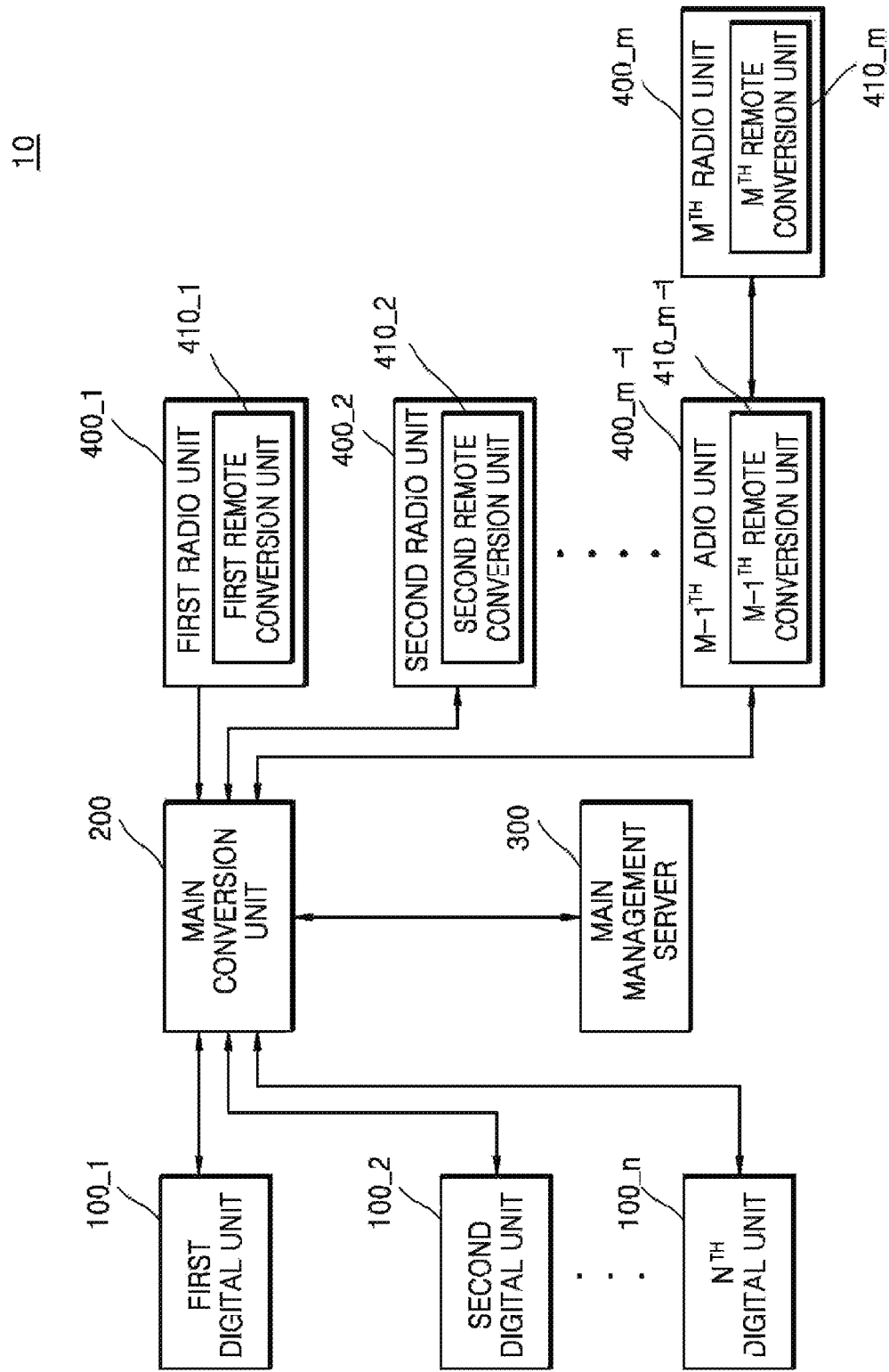
FIG. 2 is a view of a mobile communication system according to an example embodiment of the inventive concept.

FIG. 2 is a view of a mobile communication system 10 according to an example embodiment of the inventive concept.

Referring to FIG. 2, the mobile communication base station system 10 may include first through nth (n is a natural number equal to or greater than 2) digital units 100_1 through 100_n, a main conversion unit 200, a main management server 300, and first through mth (m is a natural number equal to or greater than 2) radio units 400_1 through 400_m respectively including corresponding remote conversion units of first through mth units 410_1 through 410_m. Hereinafter, an arrangement and connection relationship of each configuration will be described first, and an operation of each configuration will be described in a case of downlink and a case of uplink.

Arrangement and Connection Relationship

The first through nth digital units 100_1 through 100_n may be centralized in any one of a plurality of cell sites set by a mobile communication provider considering service coverage. However, the inventive concept is not limited thereto, and the first through nth digital units 100_1 through 100_n may be divided into at least one group and may be distributed to different cell sites for each divided group.

When the first through nth digital units 100_1 through 100_n are centralized in a specific cell site, the main conversion unit 200 may be arranged in the cell site adjacent to the first through nth digital units 100_1 through 100_n. However, the inventive concept is not limited thereto, and the main conversion unit 200 may be disposed at a cell site different from that of the centralized first through nth digital units 100_1 through 100_n. Alternatively, the main conversion unit 200 may be disposed, in the same cell site as that of any one of digital unit groups grouped and distributed to different cell sites, adjacent to the digital unit group.

The main management server 300 may be disposed at any one of a plurality of cell sites. That is, the main management server 300 may be disposed at an arbitrary position in response to a request of a mobile communication service provider. Meanwhile, FIG. 2 shows that one main management server 300 is provided in the mobile communication base station system 10, but the main management server 300 may be plural. In this case, the main management servers 300 may be centralized in any one of a plurality of cell sites, or may be distributed to at least two cell sites.

Each of the first through nth digital units 100_1 through 100_n may be connected to the main conversion unit 200 via a corresponding first transmission medium, for example, an optical cable.

The first through mth radio units 400_1 through 400_m may be distributed to a plurality of cell sites and may be separated from the first through nth digital units 100_1 through 100_n.

Each of first through m−1th radio units 400_1 through 400_m−1 may be connected in parallel with the main conversion unit 200 via a corresponding second transmission medium, for example, an optical cable, and the mth radio unit 400_m may be connected in series with the m−1th radio unit 400_m−1 via a third transmission medium, for example, an optical cable.

The main conversion unit 200 and the main management server 300 may be connected to each other via a corresponding fourth transmission medium, for example, an optical cable.

Downlink Operation

Each of the first through nth digital units 100_1 through 100_n may use at least one frequency band, and may output data in a specific frequency band to a downlink frame conforming to a protocol defined by a manufacturer of a corresponding digital unit along with control information.

For example, the first digital unit 100_1 may output first data and first control information to a first downlink frame conforming to a first protocol defined by a manufacturer of the first digital unit 100_1, and the second digital unit 100_2 may output second data and second control information to a second downlink frame conforming to a second protocol defined by a manufacturer of the second digital unit 100_2.

The first and second protocols may be closed protocols. That is, each of the first and second protocols may not be disclosed as a protocol in which standards for control information and data are defined by a manufacturer of a corresponding digital unit. However, the inventive concept is not limited thereto. For example, each of the first and second protocols may use a standard for data defined by a standard protocol, for example, any one of a common public radio interface (CPRI) protocol, an open radio equipment interface (ORI) protocol, and an open base station architecture initiative (OBSAI) protocol. However, a standard only for control information may be defined by a manufacturer of a corresponding digital unit.

The main conversion unit 200 may receive respective downlink frames from the first through nth digital units 100_1 through 100_n via the corresponding first transmission medium. The main conversion unit 200 may receive radio unit control information for controlling the first through mth radio units 400_1 through 400_m from the main management server 300 via the corresponding fourth transmission medium.

The main conversion unit 200 may reconstruct the downlink frames received from the first through nth digital units 100_1 through 100_n and the radio unit control information received from the main management server 300 to conform to an open protocol and generate a downlink transmission frame, and may output the generated downlink transmission frame. The open protocol may be open to the public, including a manufacturer of a digital unit or a radio unit. Meanwhile, the downlink transmission frame may further include synchronization information for synchronization of the first through mth radio units 400_1 through 400_m.

Each of the first through m−1th radio units 400_1 through 400_m−1 may receive the downlink transmission frame from the main conversion unit 200 via the corresponding second transmission medium, and the unit 400_m may receive the downlink transmission frame from the m−1th radio unit 400_m−1 via the third transmission medium.

The first through mth radio units 400_1 through 400_m may include the corresponding first through mth remote conversion units 410_1 through 410_m, respectively. The first through mth remote conversion units 410_1 through 410_m may extract and output at least one of radio unit control information, downlink frames, and data from the downlink transmission frame. The first through mth remote conversion units 410_1 through 410_m may distribute the extracted radio unit control information, downlink frames, and data to corresponding internal configurations of the first through mth radio units 400_1 through 400_m, for example, a radio unit controller 420 (see FIG. 4), a remote radio head 430 (see FIG. 4), and a transceiver 440 (see FIG. 4). Alternatively, the first through mth remote conversion units 410_1 through 410_m may distribute the downlink transmission frame intactly to a PHY interface 450 (see FIG. 4).

Uplink Operation

Each of the first through mth radio units 400_1 through 400_m may receive and digitize an analog radio frequency signal including data, control information, and the like from a user terminal (not shown) in a cell region in which each of the first through mth radio units 400_1 through 400_m radio unit 400_1 through 400_m is located. The first through mth remote conversion units 410_1 through 410_m respectively provided in the corresponding first through mth radio units 400_1 through 400_m may reconstruct the data, control information, and the like to conform to an open protocol along with state information of the corresponding radio units provided by the radio unit controller 420 (see FIG. 4) and generate an uplink transmission frame, and may output the generated uplink transmission frame.

The main conversion unit 200 may disassemble the uplink transmission frames transmitted from the first through mth radio units 400_1 through 400_m via the corresponding second transmission medium to extract the state information, data and control information of the radio units. The main conversion unit 200 may transmit the extracted state information of the radio units to the main management server 300 and may generate and output the data and control information as an uplink frame to conform to a protocol of each of digital units.

Each of the first through nth digital units 100_1 through 100_n may receive the uplink frame transmitted from the main conversion unit 200 via the corresponding first transmission medium, and may extract data transmitted from the terminal from the received uplink frame.

As such, the mobile communication base station system 10 converts frames conforming to a closed protocol into frames conforming to an open protocol via the main conversion unit 200 and the first through mth radio units 400_1 through 400_m in communication between the first through the nth digital units 100_1 through 100_n and the first through mth radio units 400_1 through 400_m. Accordingly, even if the first through the nth digital units 100_1 through 100_n and the first through mth radio units 400_1 through 400_m include equipment manufactured by various manufacturers, compatibility may be ensured. Therefore, a mobile communication service provider may construct a mobile communication base station system using low-cost equipment with high performance provided by various manufacturers, thereby reducing cost of constructing the mobile communication base station system.

Also, the mobile communication base station system 10 may integrally manage and control the first through nth digital units 100_1 through 100_n and the first through mth radio units 400_1 through 400_m via the main management server 300. Accordingly, the mobile communication service provider may efficiently manage and operate the entire system.

Figure 3:
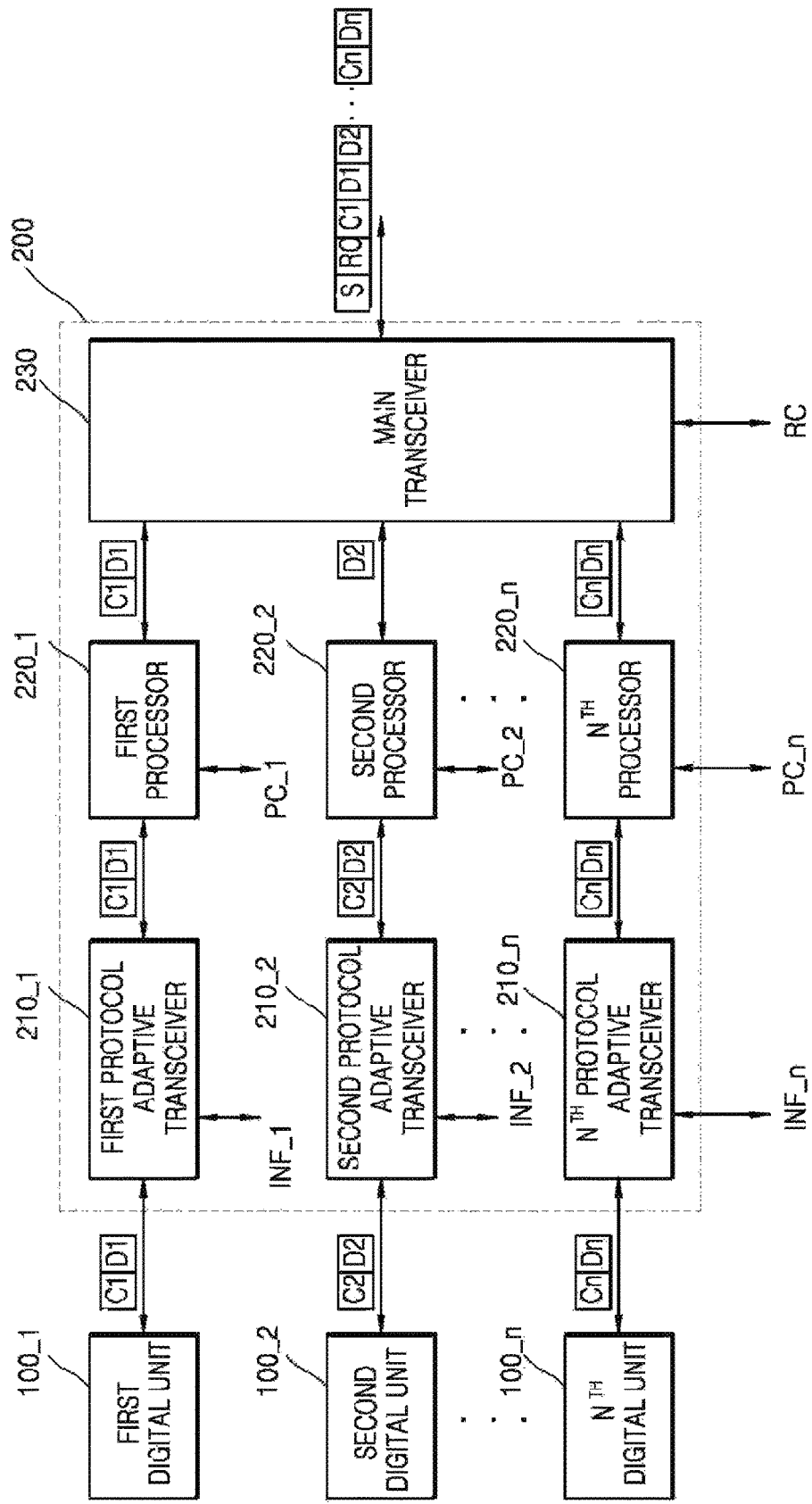
FIG. 3 is a block diagram of a partial configuration of a main conversion unit according to an example embodiment of the inventive concept.

FIG. 3 is a block diagram of a partial configuration of a main conversion unit according to an example embodiment of the inventive concept. FIG. 3 is described with reference to FIG. 2 and repeated descriptions thereof are omitted for convenience of description.

Referring to FIGS. 2 and 3, the main conversion unit 200 may include first through nth protocol adaptive transceivers 210_1 through 210_n, first through nth processors 220_1 through 220_n, and a main transceiver 230. Hereinafter, an arrangement and connection relationship of each configuration will be described first, and an operation of each configuration will be described in a case of downlink and a case of uplink.

Arrangement and Connection Relationship

Each of the first through nth protocol adaptive transceivers 210_1 through 210_n may be connected to a corresponding digital unit among the first through nth digital units 100_1 through 100_n and may be connected to a corresponding processor among the first through nth processors 220_1 through 220_n. Accordingly, the first through nth channels for the first through nth digital units 100_1 through 100_n may be respectively formed. The first through nth processors 220_1 through 220_n may be connected in parallel with the main transceiver 230.

Downlink Operation

Each of the first through nth digital units 100_1 through 100_n may output data to a downlink frame conforming to a closed protocol defined by a manufacturer of a corresponding digital unit along with control information.

For example, the first digital unit 100_1 may output a first downlink frame including first control information C1 and first data D1 and conforming to a first protocol. The second digital unit 100_2 may output a second downlink frame including second control information C2 and second data D2 and conforming to a second protocol.

Each of the first through nth protocol adaptive transceivers 210_1 through 210_n may receive protocol information related to a corresponding channel among first through nth protocol information INF_1 through INF_n provided by the main management server 300, and may receive a downlink frame input to the corresponding channel based on the received protocol information.

For example, the first protocol adaptive transceiver 210_1 may receive the first downlink frame according to the first protocol based on the first protocol information INF_1. The second protocol adaptive transceiver 210_2 may receive the second downlink frame according to the second protocol based on the second protocol information INF_2.

Each of the first through nth protocol adaptive transceivers 220_1 through 220_n may receive processor control information related to a corresponding channel among first through nth processor control information PC_1 through PC_n provided by the main management server 300, and may output a downlink frame input to the corresponding channel after removing or without removing control information in the downlink frame in response to the received processor control information.

For example, the first processor 220_1 may output the first downlink frame intactly without removing the first control information C1 in the first downlink frame transmitted from the first protocol adaptive transceiver 210_1 in response to the first processor control information INF_1. The second processor 220_1 may output the second downlink frame including only the second data D2 by removing the second control information C2 in the second downlink frame transmitted from the second protocol adaptive transceiver 210_2 in response to the second processor control information INF_2.

The main transceiver 230 may generate a downlink transmission frame by reconstructing downlink frames received from the first through nth processors 220_1 through 220_n and radio unit control information RC provided by the main management server 300 to conform to an open protocol. Furthermore, the main transceiver 230 may also include synchronization information S for synchronization of the first through mth radio units 400_1 through 400_m in the downlink transmission frame.

For example, the main transceiver 230 may generate the downlink transmission frame by reconstructing the synchronization information S, the radio unit control information RC, the first control information C1 of the first downlink frame transmitted from the first processor 220_1 and the first data D1, and the second data D2 of the second downlink frame transmitted from the second processor 220_n in series.

The main transceiver 230 may transmit the generated downlink transmission frame to the first through mth radio units 400_1 through 400_m.

Uplink Operation

The main transceiver 230 may receive an uplink transmission frame from the first through mth radio units 400_1 through 400_m. The uplink transmission frame may include at least some of synchronization information, state information of a corresponding radio unit, data transmitted from a plurality of terminals, and control information.

The main transceiver 230 may extract the state information of the corresponding radio unit, the data, and the control information by disassembling the received uplink transmission frame.

The main transceiver 230 may transmit the extracted state information of the corresponding radio unit to the main management server 300 and may distribute the extracted data and control information to a processor of a corresponding channel among the first through nth processors 220_1 through 220_n.

When there is no control information corresponding to data input to a corresponding channel in response to processor control information related to the corresponding channel among the first through nth processor control information PC_1 through PC_n, each of the first through nth processors 220_1 through 220_n may add and output control information corresponding to the data. For example, the second processor 220_2 may receive only data from the main transceiver 230 and may add and output control information corresponding to the data.

Meanwhile, when there is control information corresponding to data input to a corresponding channel in response to processor control information related to the corresponding channel among the first through nth processor control information PC_1 through PC_n, each of the first through nth processors 220_1 through 220_n may output the data together with the control information corresponding to the data.

Each of the first through nth protocol adaptive transceivers 210_1 through 210_n may generate and output data and control information input to a corresponding channel based on protocol information related to the corresponding channel among the first through nth protocol information INF_1 through INF_n to an uplink frame conforming to a protocol for the corresponding channel.

For example, the first protocol adaptive transceiver 210_1 may output data and control information to a first uplink frame conforming to the first protocol based on the first protocol information INF_1, and the second protocol adaptive transceiver 210_2 may generate and output data and control information to a second uplink frame conforming to the second protocol based on the second protocol information INF_2.

The first through nth digital units 100_1 through 100_n may respectively receive uplink frames transmitted from the first through nth protocol adaptive transceivers 210_1 through 210_n, and may extract data transmitted by terminals from the received uplink frame.

Figure 4:
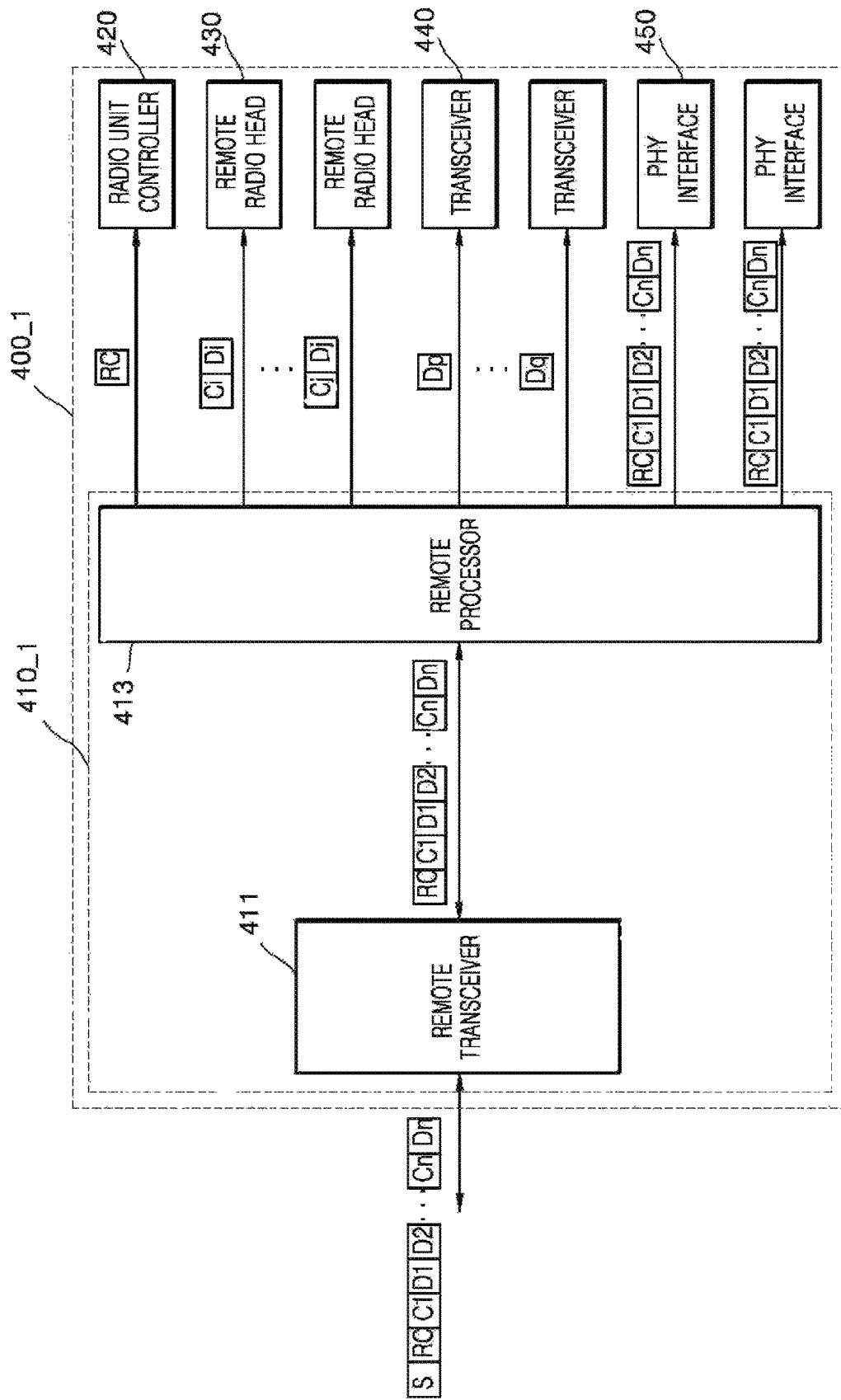
FIG. 4 is a block diagram of a partial configuration of a radio unit according to an example embodiment of the inventive concept.

FIG. 4 is a block diagram of a partial configuration of a radio unit according to an example embodiment of the inventive concept. FIG. 4 shows an example of the first radio unit 400_1, and each of the second through mth radio units 400_2 through 400_m may have the same or similar configuration as the first radio unit 400_1 of FIG. 4 Therefore, detailed descriptions thereof will not be given herein. FIG. 4 is described with reference to FIGS. 2 and 3 and repeated descriptions thereof are omitted for convenience of description.

Referring to FIGS. 2 to 4, the first radio unit 400_1 may include a first remote conversion unit 410_1 including a remote transceiver 411 and a remote processor 413, a radio unit controller 420, at least one remote radio head 430, at least one transceiver 440, and at least one PHY interface 450.

For convenience of explanation, FIG. 4 illustrates that the first radio unit 400_1 includes a remote radio head 430, a transceiver 440, and a PHY interface 450, but the inventive concept is not limited thereto. The first radio unit 400_1 may include only one of the remote radio head 430, the transceiver 440, and the PHY interface 450, or may include two of them. Hereinafter, an arrangement and connection relationship of each configuration will be described first, and an operation of each configuration will be described in a case of downlink and a case of uplink.

Arrangement and Connection Relationship

The first remote conversion unit 410_1 may be connected to the main conversion unit 200 through the remote transceiver 411, and may be connected in parallel with the radio unit controller 420, the at least one remote radio head 430, the at least one transceiver 440, and the at least one PHY interface 450 via the remote processor 413.

Downlink Operation

The remote transceiver 411 may receive a downlink transmission frame transmitted from the main conversion unit 200 according to an open protocol. The remote transceiver 411 may receive the downlink transmission frame in synchronization with other radio units according to the synchronization information S included in the received downlink transmission frame. The remote transceiver 411 may remove the synchronization information S from the received downlink transmission frame and transmit the downlink transmission frame to the remote processor 413.

The remote processor 413 may disassemble the downlink transmission frame from which the synchronization information S has been removed, and may extract radio unit control information, downlink frames, or data and distribute the same to corresponding configurations. Alternatively, the remote processor 413 may output the downlink transmission frame intactly.

The radio unit controller 420 may receive the radio unit control information RC from the remote processor 413 and control each configuration of the first radio unit 400_1 in response to the received radio unit control information RC. For example, the radio unit controller 420 may control digital/analog conversion processing of a downlink frame of the transceiver 440 in response to the radio unit control information RC.

The remote radio head 430 may receive a downlink frame including control information and data from the remote processor 413 and may convert the data of the received downlink frame into an analog radio signal to transmit the converted analog radio signal to a terminal (not shown) via an antenna (not shown). Here, the remote radio head 430 may convert the data of the received downlink frame into an analog radio signal according to the control information of the received downlink frame, and may output the converted analog radio signal.

The transceiver 440 may receive a downlink frame including data, that is, data from which control information has been removed, and may convert the received downlink frame into an analog radio signal to transmit the converted analog radio signal to a terminal (not shown) via an antenna (not shown).

The PHY interface 450 may receive the downlink transmission frame, from which the synchronization information S has been removed, intactly from the remote processor 413, and may retransmit the received downlink transmission frame to another radio unit (particularly in a case of m−1th radio unit 410_m−1 and mth radio unit 410_m).

Uplink Operation

The radio unit controller 420 may output state information of the first radio unit 400_1, for example, information indicating whether an operation is normal.

The remote radio head 430 may receive an analog radio signal including data from a terminal (not shown) via an antenna (not shown). The remote radio head 430 may digitize the received analog radio signal and output the digitized analog radio signal, i.e., digitized data together with control information.

The transceiver 440 may receive an analog radio signal including data from the terminal via the antenna (not shown), and may digitize the received analog radio signal to output digitized data.

The PHY interface 450 may receive an uplink transmission frame generated in compliance with an open protocol from another radio unit (particularly in a case of the m−1th radio unit 410_m−1).

The remote processor 413 may combine, for example, serialize the state information of the first radio unit 400_1 transmitted from the radio unit controller 420, the data and control information transmitted from the remote radio head 430, and the data transmitted from the transceiver 440 to transmit the same to the remote transceiver 411. Alternatively, the remote processor 413 may transmit the uplink transmission frame generated by another remote unit, which is received from the PHY interface 450, to the remote transceiver 411.

The remote transceiver 411 may generate an uplink transmission frame conforming to an open protocol based on the combined state information, data and control information, and may transmit the generated uplink transmission frame to the main conversion unit 200. Alternatively, the remote transceiver 411 may transmit the uplink transmission frame generated by another other remote unit to the main conversion unit 200.

While one or more example embodiments have been described with reference to the figures, it will be understood by those of ordinary skill in the art that various changes in form and details may be made therein without departing from the spirit and scope of the disclosure as defined by the following claims.

The invention claimed is:

1. A base station system comprising:
a first unit implemented by at least one processor and configured to receive a first downlink frame conforming to a first protocol and a second downlink frame conforming to a second protocol, and generate a downlink transmission frame by reconstructing the first and second downlink frames to conform to a third protocol; and
a second unit implemented by at least one processor and configured to receive the downlink transmission frame from the first unit and disassemble the received downlink transmission frame to output at least one of the first and second downlink frames,
wherein the first protocol, the second protocol and the third protocol are different from each other,
wherein the first downlink frame includes first control information and first data, and the second downlink frame includes second control information and second data, and
wherein the first unit is configured to remove one of the first control information and the second control information from the first and second downlink frames to generate the downlink transmission frame.

2. The base station system of claim 1, wherein
the first and second protocols are different closed protocols, and
the third protocol is an open protocol.

3. The base station system of claim 1, wherein the first unit comprises:
a first protocol adaptive transceiver configured to receive the first downlink frame;
a second protocol adaptive transceiver configured to receive the second downlink frame;
a first processor configured to receive the first downlink frame from the first protocol adaptive transceiver, and configured to remove and output the first control information from the first downlink frame or output the first downlink frame intactly;
a second processor configured to receive the second downlink frame from the second protocol adaptive transceiver, and configured to remove and output the second control information from the second downlink frame or output the second downlink frame intactly; and
a main transceiver connected to the first and second processors and configured to reconstruct any one of the first and second control information and the first and second data to conform to the third protocol and generate the downlink transmission frame.

4. The base station system of claim 1, wherein the second unit comprises:
a remote transceiver configured to receive the downlink transmission frame; and
a remote processor configured to disassemble the received downlink transmission frame to output at least one of the first and second downlink frames.

5. The base station system of claim 4, wherein the second unit further comprises:
at least one remote radio head configured to receive a downlink frame including control information of the first and second downlink frames from the second unit.

6. The base station system of claim 5, wherein
the remote radio head is configured to convert data of the received downlink frame into an analog radio frequency signal according to the control information included in the received downlink frame and output the converted analog radio frequency signal.

7. The base station system of claim 4, wherein the second unit further comprises:
at least one transceiver configured to receive a downlink frame, from which control information has been removed, of the first and second downlink frames.

8. The base station system of claim 7, wherein
the transceiver is configured to convert data of the received downlink frame into an analog radio frequency signal and output the converted analog radio frequency signal.

9. The base station system of claim 1, wherein
the second unit is configured to output the received downlink transmit frame intactly, and
the second unit further comprises:
at least one PHY interface configured to receive the downlink transmission frame from the first unit and configured to transmit the received downlink transmission frame to another second unit.

10. The base station system of claim 1, further comprising:
a main management server configured to generate radio unit control information for controlling the second unit, wherein
the first unit further receives the radio unit control information from the main management server, and reconstructs the radio unit control information and the first and second downlink frames to conform to the third protocol and generates the downlink transmission frame, and
the second unit disassembles the downlink transmission frame to further output the radio unit control information.

11. The base station system of claim 10, wherein the second unit further comprises:
a controller configured to receive the radio unit control information from the first unit and control the second unit in response to the radio unit control information.

12. A base station system comprising:
a second unit implemented by at least one processor and configured to digitize analog radio frequency signals received from a plurality of terminals and generate an uplink transmission frame conforming to a third protocol; and
a first unit implemented by at least one processor and configured to receive the uplink transmission frame from the second unit and disassemble the received uplink transmission frame to generate a first uplink frame conforming to a first protocol and a second uplink frame conforming to a second protocol, and
wherein the first protocol, the second protocol and the third protocol are different from each other, and
wherein the first unit comprises first and second processors respectively configured to:
if data and corresponding control information are obtained from the received uplink transmission frame, output the data and the control information intactly, and
if data is obtained without corresponding control information from the received uplink transmission frame, add the corresponding control information to the data, and output the data and the added control information.

13. The base station system of claim 12, wherein
the first and second protocols are different closed protocols, and
the third protocol is an open protocol.

14. The base station system of claim 12, wherein the second unit further comprises:
at least one remote radio head configured to digitize and output data included in some of the analog radio frequency signals together with corresponding control information; and
at least one transceiver configured to digitize and output data included in some other of the analog radio frequency signals.

15. The base station system of claim 14, wherein the second unit further comprises:
a remote processor configured to generate the uplink transmission frame by combining the digitized data and control information transmitted from the remote radio head and the digitized data transmitted from the transceiver; and
a remote transceiver configured to transmit the uplink transmission frame to the first unit.

16. The base station system of claim 15, wherein the second unit further comprises:
a controller configured to output state information of the second unit to the remote processor, wherein
the remote processor is configured to generate the uplink transmission frame by combining the digitized data and control information transmitted from the remote radio head, the digitized data transmitted from the transceiver, and the state information transmitted from the controller.

17. The base station system of claim 12, wherein the second unit further comprises:
at least one PHY interface configured to receive an uplink transmission frame from another second unit, wherein the second unit is configured to transmit the uplink transmission frame received from the other second unit to the first unit intactly.

18. The base station system of claim 12, wherein the first unit further comprises:
a main transceiver configured to receive the uplink transmission frame and disassemble the received uplink transmission frame;
a first protocol adaptive transceiver connected to the first processor and configured to generate the first uplink frame conforming to the first protocol using control information and data output from the first processor; and
a second protocol adaptive transceiver connected to the second processor and configured to generate the second uplink frame conforming to the second protocol using control information and data output from the second processor.

19. The base station system of claim 18, further comprising:
a main management server configured to generate first processor control information for controlling whether to add control information in the first processor, second processor control information for controlling whether to add control information in the second processor, and the first and second protocol information, wherein
each of the first and second processors is configured to output control information and data corresponding to each other intactly in response to corresponding processor control information of the first and second processor control information, or configured to add corresponding control information to data having no control information and output the data, and
the first protocol adaptive transceiver is configured to generate the first uplink frame based on the first protocol information, and
the second protocol adaptive transceiver is configured to generate the second uplink frame based on the second protocol information.

* * * * *